April 18, 1961  E. W. DE KONING  2,980,234
LUMBER FEEDER MECHANISM
Filed April 22, 1960  2 Sheets-Sheet 1

Edwin W. DeKoning
INVENTOR.

BY Ramsey and Kolisek
Attys.

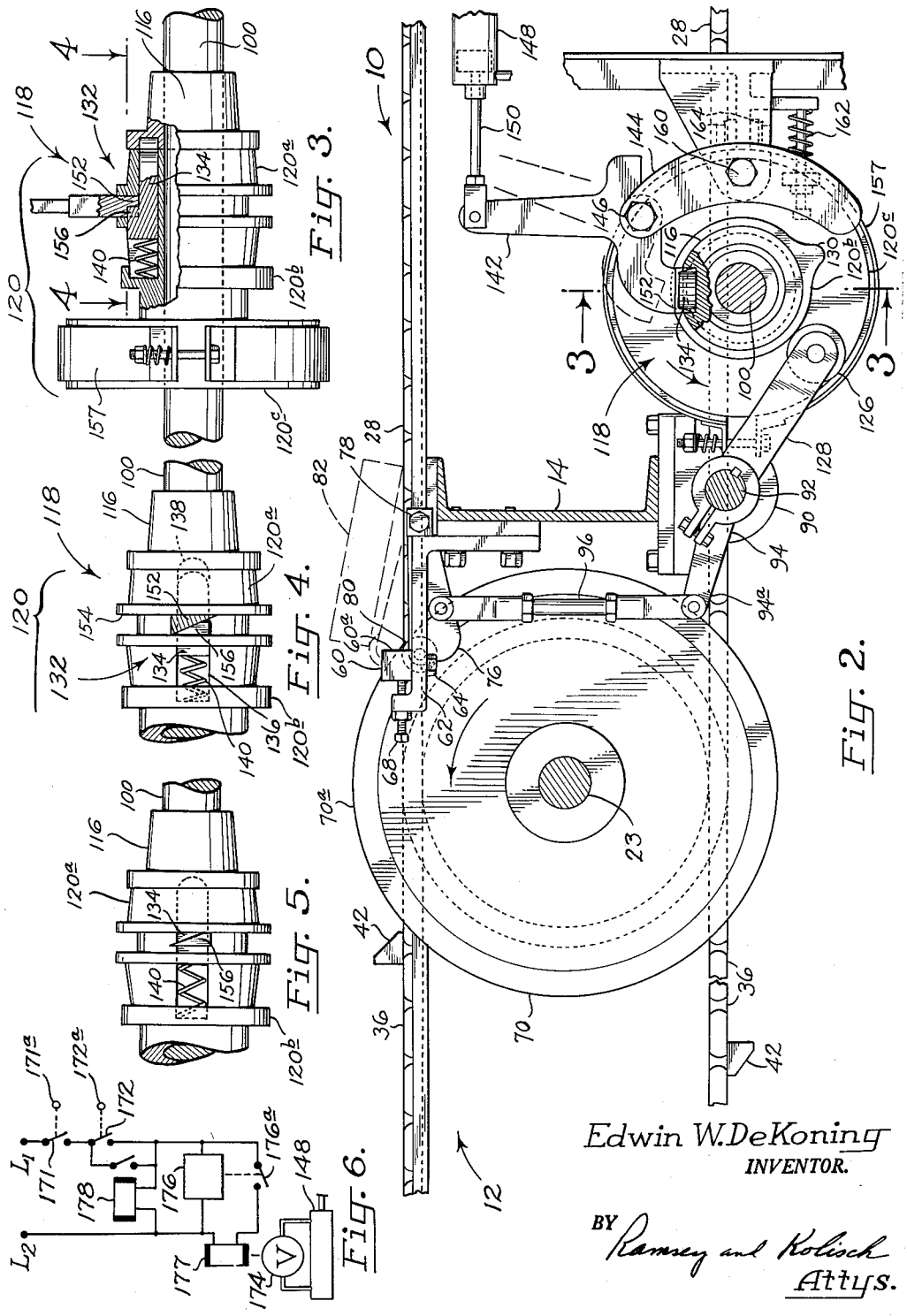

United States Patent Office 2,980,234
Patented Apr. 18, 1961

2,980,234
LUMBER FEEDER MECHANISM
Edwin W. De Koning, 8205 S.W. Hunziker, Portland 23, Oreg.

Filed Apr. 22, 1960, Ser. No. 24,016

11 Claims. (Cl. 198—34)

This invention relates to feeder mechanisms, and more particularly to a feeder mechanism for feeding lumber onto a conveyer.

In a saw mill, for example, frequently it is desirable to position a series of lumber pieces or boards on a conveyer with such boards spaced apart. Thus, as the boards travel along the conveyer, selected work operations may be performed on individual boards. By way of illustration, boards may be transported into a gang saw assembly, and suitable saws in the assembly be actuated to trim each board. This invention has to do with an improved feeder, which will feed boards one at a time onto a conveyer, and which will perform the operation in a practical and highly satisfactory manner.

An object of the invention is to provide an improved feeder which will transport boards one at a time to a conveyer, inhibiting frequent misses or over-feeding.

Another object is to provide an improved feeder that can handle wide or narrow boards with equal facility, and that will operate to move one board at a time, regardless of variations in the width of a board, or in the length thereof.

Another object of the invention is to provide an improved feeder, wherein operation of the feeder is correlated with movement of an off-bearing conveyer and with the size of a backlog of boards on a holding conveyer.

Still another object is to provide novel control mechanism for a feeder, operable to coordinate feed with the size of a backlog of boards on a holding conveyer, and the movement of an off-bearing conveyer fed by the feeder.

A further object is to provide a feeder wherein boards fed to an off-bearing conveyer have their forward progress started by lifting the forward edge of each board over an abutment without disturbing its rear edge. Each board is moved over the abutment by novel roller means interposed between the discharge end of a holding conveyer and the feed end of the off-bearing conveyer.

A still further object of the invention is to provide a feeder wherein a backlog of boards is relied upon to aid in the transport of a board through the feeder.

Other objects and advantages will appear as the following description is read in conjunction with the accompanying drawings, wherein:

Fig. 2 is a sectional view taken along the line 2—2 in Fig. 1, slightly enlarged, however, and illustrating details of a regulator mechanism that coordinates movement of the off-bearing conveyer with the feed thereto;

Fig. 3 is a sectional view taken along the line 3—3 in Fig. 2 illustrating details of a clutch mechanism included in the regulator mechanism;

Fig. 4 is a view taken along the line 4—4 in Fig. 3, further illustrating the clutch mechanism;

Fig. 5 is a view similar to Fig. 4 but showing the parts in a different position; and Fig. 6 is a schematic view of an electric control circuit utilized in the device.

Figure 1:
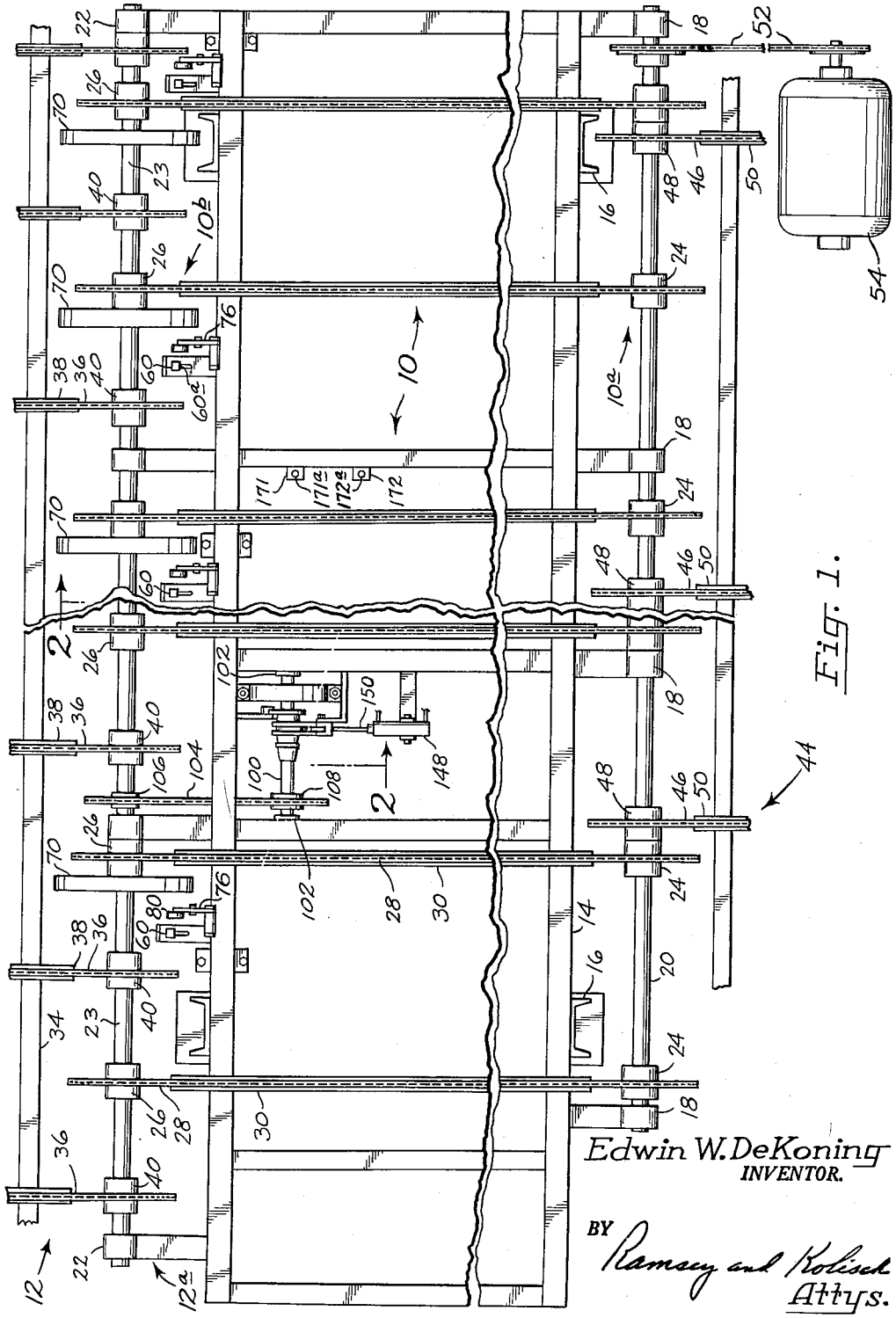
Fig. 1 is a plan view of a feeder constructed according to this invention, showing at the top of the figure an off-bearing conveyer, and near the base of the figure a holding or feed conveyer, and transfer means interposed between the two conveyers for moving boards from one to the other.

Referring now to the drawings, and in particular to Fig. 1: 10 indicates generally a feed or holding conveyer, having a feed or entering end 10a at the bottom of the figure and a discharge end 10b adjacent the top of the figure. Aligned substantially with holding conveyer 10 and forming a continuation thereof is an off-bearing conveyer, indicated generally at 12. This has an entering end 12a adjacent discharge end 10b. The feed and off-bearing conveyers are more or less conventional in construction.

Thus, feed conveyer 10 comprises a frame 14 supported above the floor by suitable standards 16. Mounted on frame 14 adjacent the feed end 10a of the conveyer are bearings 18. Journaled in bearings 18 and extending transversely between the sides of the conveyer is a shaft 20. The outfeed end 10b of the conveyer has a similar set of bearings 22 secured to the frame, and journaled in these bearings is a shaft 23. Secured to shaft 20 are sprockets 24 spaced at intervals therealong, and secured to shaft 23 are sprockets 26. Trained over complementary pairs of sprockets 24, 26 are conventional, smooth-surfaced or "slick" chains 28. They have their upper runs sliding as they travel across the conveyer on ways 30. These upper runs occupy a common, substantially horizontal plane, and define the support level of the feed or holding conveyer.

Off-bearing conveyer 12 comprises a frame partially indicated at 34. Extending over this frame and disposed in a common, substantially horizontal plane are the upper runs of a series of chains 36. These have their upper runs supported in ways 38. The rear ends of the reaches of the chains are trained over sprockets 40 secured to shaft 23, and the forward ends of the reaches are trained over a similar set of sprockets (not shown). As can be seen in Fig. 2, chains 36 of the off-bearing conveyer are lug chains, and are equipped at intervals along their length with lugs 42.

Also shown in Fig. 1 is a part of conveyer 44 used in transporting boards or lumber pieces onto the feed or holding conveyer 10. Portions of conveyer 44 comprise chains 46 trained over sprockets 48. Such chains have their upper runs traveling over ways 50.

The various conveyers are driven in any suitable manner. Thus, in the embodiment illustrated, shaft 20 is driven by a drive chain 52 and a motor 54. Movement of the conveyer chains is such that boards travel upwardly from the bottom to the top in Fig. 1, and from right to left in Fig. 2.

Between the holding and off-bearing conveyers, and adjacent the discharge end of the holding conveyer, are a series of blocks or stops 60. These are spaced at intervals between the sides of the conveyer. Blocks 60 have top ends spaced slightly above the support level of the holding conveyer, and their rear faces 60a constitute abutment means in the feeder. Referring to Fig. 2, the blocks are mounted on brackets 62 secured to frame 14. The mounting for each block includes a nut and bolt assembly 64 that may be loosened if it is desired to adjust the position of the block along the length of a bracket 62. An adjustment screw 68 is also provided that bears against the forward face of each stop. In setting up the feeder, blocks or stops 60 are aligned in a direction extending transversely of the conveyer. During operation of the feeder, a series of boards are transported edgewise down conveyer 10 by chains 28 until the lead edge of the leading board contacts blocks 60. This stops forward travel of the board, and subsequent boards traveling down the conveyer, on coming into contact with the lead board, accumulate to the rear of the stops to form a backlog.

Secured to shaft 23 and spaced along the shaft are a series of rubber surfaced wheels 70. With reference to Fig. 2, it will be noted that the rotation axis of shaft 23 is spaced forwardly of the rear faces of blocks 60 and below the support level of the feed and off-bearing conveyers. This puts the rotation axis of the wheels in the same position, but the wheels are of such a size that they have upper circumferential surface portions, indicated at 70a, disposed above the support level of the holding and off-bearing conveyers, and above the tops of the blocks 60. Put in another way, the wheels 70 have upper circumferential surface portions subtended by the ends of the holding and off-bearing conveyers. The wheels together constitute a transfer roller means in the apparatus for carrying a board loosened from the holding conveyer onto the off-bearing conveyer. The wheels operate to engage the bottom surface of a board moved thereover, and thence carry it forwardly, whence the board is deposited on the off-bearing conveyer on further rotation of the wheels. By locating the rotation axis of this transfer means below the support level of the conveyers, a board need not assume a near vertical position on first moving onto the wheels.

Mounted on frame 14 adjacent each block or stop 60 and below the support level of conveyer 10 is a kicker arm 76. Each is pivoted onto frame 14 by a pivot connection 78. On the non-pivoted or free end of each arm is mounted a roller 80. During periods of non-actuation, the non-pivoted ends of the arms occupy the position shown in solid outline in Fig. 2, i.e., a position slightly below the support level of the holding conveyer. The arms may be pivoted to the raised position illustrated in dashed outline in Fig. 2, which has the effect of moving rollers 80 upwardly under the forward edge of a board deposited on the rollers, whereby the forward edge of the board is raised above the top of the blocks. Such a raised board is exemplified by board 82 in Fig. 2. The kicker arms, rollers, and blocks 60 in combination comprise a shiftable stop means in the apparatus, adjustable between a hold position, i.e., the position illustrated in solid outline in Fig. 2 wherein boards are stopped from forward travel, and a release position illustrated by the arm in dashed outline, wherein boards are released for forward travel.

A feature of the invention is the provision of mechanism for actuating the kicker arms in unison, and at times related to movement of the off-bearing conveyer and the size of a backlog of boards on the holding conveyer.

Specifically, journaled in bearings 90 mounted on frame 14, and extending transversely of the frame, is a rock shaft 92. Secured to the rock shaft is a series of crank arms 94, one for each kicker arm. The outer ends 94a of crank arms 94 are connected by linkages 96 to intermediate portions of the kicker arms 76. The mechanism described constitutes the actuating mechanism for shifting the kicker arms between hold and release positions. Thus, on rotation of the rock shaft in a clockwise direction in Fig. 2, the ends 94a of the arms are raised producing upward pivotal movement of the kicker arms to a release position. Conversely, rotation of the shaft in the opposite direction serves to shift the arms downwardly.

The rock shaft is rotated momentarily first in a clockwise direction, and then returned, by the regulator mechanism including a clutch illustrated in Figs. 2, 3, 4, and 5. Explaining this mechanism: To the rear of rock shaft 92 and paralleling the shaft is a stub shaft 100. Stub shaft 100 is rotatably mounted in frame 14 by bearings 102 (see Fig. 1), and the stub shaft is driven by shaft 23 through a chain 104 and sprockets 106, 108. Thus, the stub shaft is rotated in timed relation with movement of the off-bearing conveyer.

Secured to the stub shaft, to be rotated constantly therewith, is a driving clutch part or element 116 of a clutch assembly, generally indicated at 118. Adjacent element 116 and rotatably mounted on the stub shaft is a driven unit 120, comprising a driven clutch element 120a, a cam portion 120b, and a brake drum portion 120c. The latter portions are integral one with the other.

Cam portion 120b of the clutch assembly is aligned with a roller 126 mounted on one end of an arm 128. The other end of arm 128 is secured to rock shaft 92. The cam is provided with a node 130. On rotation of the cam in the direction of the arrow in Fig. 2, the node comes into contact with roller 126 and causes arm 128 first to rotate in a clockwise direction, and when the node moves free of the roller, counterclockwise rotation of arm 128 (the weight of the parts connected to the rock shaft returning arm 128 to its original position) is produced.

Interposed between driving clutch element 116 and unit 120 is power-transmitting mechanism 132, adjustable between an inoperative position, illustrated in Figs. 3 and 4, wherein unit 120 and element 116 are disconnected from each other, and an operative position, illustrated in Fig. 5, wherein a driving connection results. This mechanism comprises a shiftable bolt member 134, mounted in a groove 136 formed in unit 120. Groove 136 registers in element 116, with a groove 138. Contacting bolt member 134 and operable to urge it from left to right in the figures is a coil spring 140. The bolt member in an inoperative position is retracted from groove 138, and in an operative position extends into groove 138.

For controlling movement of the bolt member into and out of groove 138, a clutch operating lever 142 is provided which is pivotally mounted intermediate its ends on a mounting 144 by pivot connection 146. The lever is pivoted by an air cylinder 148, which has its piston connected to an upper end of clutch operating lever 142 by rod 150. Operating lever 142 has a wedge-shaped lower end 152. In the substantially vertical position illustrated in solid outline in Fig. 2 the lower end 152 rides in a groove 154 of unit 120. In this position, if bolt member 134 is engaging groove 138 and the unit 120 and element 116 are rotating together, on continued rotation of unit 120, the pointed end of wedge-shaped end 152 will be caused to move against a bevelled portion 156 of the bolt member. When this occurs, on further rotation of unit 120, the bolt member through a wedging action is withdrawn from groove 138. In order to return the bolt member to its operative or locking position, operating lever 142 is pivoted to the release position indicated by the dashed outline in Fig. 2, which moves its wedge-shaped end out of groove 154 and the path of bevel portion 156. This enables spring 140 to shift the bolt member to the right, provided groove 136 registers with groove 138.

Brake drum portion 120c is engaged by a brake band 157 mounted on frame 14. The brake band always exerts a slight braking action on unit 120 and has the effect of immediately stopping unit 120 as soon as bolt member 134 is withdrawn from groove 138.

It should be emphasized that the mechanism operatively interconnecting unit 120 with part 116 produces a driving connection only when the driving part 116 occupies a predetermined position relative to the driven part of unit 120. This follows from the fact that groove 138 is moved into registry with groove 136 only once for each complete revolution of part 116 relative to unit 120. The parts are organized so that a registering position is obtained at a time before a set of lugs on the chains of the off-bearing conveyer move up to the upper runs. After unit 120 and element 116 are locked together, cam 120b will start to move, and actuation of the rock shaft 92 by cam 120b is timed so that a board kicked off the holding conveyor and transferred to the off-bearing conveyer arrives on the latter conveyer just in front of a set of lugs moving forwardly from the feed end of the off-bearing conveyer.

It will be noted that disengagement of the bolt member with groove 138 is produced through a welding action resulting from rotation of unit 120, and that rotation of unit 120 is derived from rotation of the driving part 116. Thus, as the bolt member is loosened, automatically the force producing loosening tends to be cut off. To insure positive and complete retraction of the bolt member from groove 138, mounting 144 for the clutch operating lever is pivoted at 160 to frame 14 and a small amount of pivotal movement (limited by stops 164) is afforded the mounting. A coil spring 162 upon the mounting tends to be compressed during initial disengagement of the bolt member, by pivotal movement of mounting 144 in a counter clockwise direction in Fig. 2. The pivotal movement is sufficient to impart a small amount of loading to the spring, and as disengagement approaches, the spring recoils to produce rapid disengagement.

With reference now to Figs. 1 and 6, 171 and 172 identify a pair of switches, with actuating buttons 171a, 172a for actuating the same. These buttons are in the path of boards traveling over conveyer 14 and are thus contacted by boards moving over the same. Switches 171, 172 control a circuit, illustrated in Fig. 6, that actuate a valve 174 controlling air cylinder 148.

Referring to Fig. 6, switches 171, 172 are connected in series, and to a source conductor L1. Switch 172 is connected through a conventional timer 176 to another source conductor L2. Timer 176 is conventional, and operates, a short time interval after it is energized, to close a switch 176a. Switch 176a when closed completes a circuit to the solenoid of a relay 177. Relay 177 controls valve 174, and when energized causes valve 174 to be moved to a position producing contraction of the air cylinder (and movement of the clutch operating lever to its release position). Also included in the circuit is a holding relay 178, that operates when energized to complete a circuit around switch 172.

Explaining the operation of the circuit, as a backlog of boards builds up behind stops 60, first switch 171 is closed (by a board lying on top of button 171a) and then as the backlog continues to build up, switch 172 is closed (by a board lying on top of button 172a). This produces energizement of timer 176, and, after a short time interval, closure of switch 176a. It also produces closure of the switch of relay 178 so that switch 172 is by-passed. On closure of switch 176a, relay 177 is energized with the result that air cylinder 148 contracts and the clutch operating lever is moved to its release position. This condition remains until switch 171 opens, which occurs on the backlog of boards behind stops 60 being reduced to such an extent that the rear of the backlog is in front of switch 171. As the rear of the backlog moves forwardly from switch 172 to switch 171, switch 172 opens, but since relay 178 is energized and its switch closed, this has no effect. When switch 171 opens, relay 177 is deenergized and valve 174 is adjusted to return the clutch operating lever to its original position. The timer is included to prevent moving boards passing over switches 171, 172 from producing inadvertent operation. By the use of two switches 171, 172, both of which must be covered to start operation and uncovered to stop operation, a spread of boards is fed through the feeder with each operating cycle, and the number of clutch actuations needed to feed a given number of boards is reduced.

The feeder mechanism described operates in the following manner: After the apparatus is started up and is in running condition, the chains of the holding and off-bearing conveyers are moving (at substantially the same speed) and the transfer wheels 70 (constituting the transfer roller means) intermediate the conveyers are also rotating, such wheels being secured to rotating shaft 23.

A series of boards deposited on the holding conveyer travel down the conveyer, until the leading edge of the lead board strikes the rear faces of stops 60. This limits forward travel of the board. As succeeding boards travel down the conveyer, a backlog of boards is built up toward the rear of the stops, with the boards sliding on the "slick" chains of conveyer 10. The backlog continues to be built up until switches 171, 172 are closed. When this occurs, and after a short time interval (such being necessary to prevent a single traveling board from starting feeding), valve 174 is adjusted to produce contraction of air cylinder 148, and movement of clutch operating lever 142 to its release position.

Upon movement of the clutch operating lever to a release position, spring 140 urges bolt member 134 toward driving part or element 116. A driving connection between part 116 and unit 120 does not occur, however, until groove 138 moves into registry with groove 136. This occurs in timed relation with the movement of the off-bearing conveyer. When grooves 136 and 138 move into registry, bolt member 134 shifts into groove 138 to produce a driving connection and rotation of unit 120 conjointly with element 116. This results in node 130 of cam 120b moving into engagement with roller 126, and actuation of the rock shaft and kicker arms.

Upon actuation of the kicker arms, the lead edge of the leading piece of lumber on the holding conveyer is raised above the tops of the stops. The rear edge of the board remains in contact with the chains of the conveyer. The friction of the chains on the rear edge of the displaced board and the pressure of the backlog of boards engaging the rear edge of the displaced board produce a force pushing the board over the steps and onto wheels 70. Continued movement of the displaced board forwardly results in the wheels finally lifting the board from conveyer 10 and depositing it on the chains of the off-bearing conveyer directly in front of a set of lugs on the chains. Such action is repeated with each revolution of cam 120b, until such time as the clutch operating lever is returned to the upright position shown in solid outline in Fig. 2. This occurs when the backlog has been reduced sufficiently to uncover switch 171. On return of the clutch operating lever, bolt member 134 is shifted out of groove 138, upon sufficient rotation of unit 120 to cause the wedge-shaped end of lever 142 to engage beveled portion 156. The parts have then returned to their original position, ready to undergo another cycle upon the build up of another backlog sufficient to close both switches 171, 172.

An important feature of the invention is the use of a backlog of boards on the holding conveyer to assist in the movement of a board onto the transfer wheels. With relatively narrow boards, the traction of the chains in conveyer 10 alone may not be sufficient to cause a board to move over the stops and onto the transfer rollers. By accumulating boards on the holding conveyer, pressure on the lead board is produced that assures that narrow and wide boards move forwardly with substantially equal facility. Further, the backlog enables the clutch mechanism to be operated with less frequency, and this reduces wear on the clutch.

It is claimed and desired to secure by Letters Patent:

1. Feeder mechanism for feeding lumber pieces onto an off-bearing conveyer comprising a constantly driven holding conveyer mounted with its discharge end adjacent the feed end of the off-bearing conveyer, shiftable stop means adjacent said discharge end adjustable between hold and release positions and operable in a hold position to inhibit forward progress of lumber pieces beyond the holding conveyer and in a release position to release such pieces for forward travel, and mechanism for operating said shiftable stop means, said mechanism having an element moved in timed relation with movement of the off-bearing conveyer, sensing means for sensing a backlog of lumber pieces on the holding conveyer behind said shiftable stop means, actuating mechanism operable when actuated to shift said shiftable stop means to its release position, and regulator mechanism operatively interconnecting said element, sensing means, and actuating mechanism whereby said actuating mechanism is actuated at intervals regulated by both said sensing means and the position of said element.

2. Feeder mechanism for feeding lumber pieces onto an off-bearing conveyer comprising a constantly driven holding conveyer mounted with its discharge end adjacent the feed end of the off-bearing conveyer, shiftable stop means adjacent said discharge end adjustable between hold and release positions and operable in a hold position to inhibit forward travel of lumber pieces beyond the holding conveyer and in a release position to release such pieces for forward travel, and mechanism for operating said shiftable stop means, said mechanism comprising a driving part movable in timed relation with the off-bearing conveyer, actuating mechanism operable when actuated to shift said shiftable stop means to its release position, a driven part for actuating said actuating mechanism, sensing means for sensing a backlog of lumber pieces on said holding conveyer behind said shiftable stop means, and mechanism for drivingly connecting said driving and driven parts operatively connected to said sensing means to be controlled thereby.

3. Feeder mechanism for feeding lumber pieces onto an off-bearing conveyer comprising a constantly driven holding conveyer mounted with its discharge end adjacent the feed end of the off-bearing conveyer, shiftable stop means adjacent said discharge end adjustable between hold and release positions and operable in a hold position to inhibit forward travel of lumber pieces beyond the holding conveyer and in a release position to release such pieces for forward travel, and mechanism for operating said shiftable stop means, the latter mechanism comprising a driving element movable in timed relation with the off-bearing conveyer, actuating mechanism operable when actuated to shift said shiftable stop means to its release position, a rotatably mounted, ordinarily stationary cam for actuating said actuating mechanism and constructed on rotation of the cam to shift said shiftable stop means first momentarily to its release position and then to return the stop means to its hold position, power-transmitting mechanism for drivingly connecting said driving element and cam whereby the two move together, said power-transmitting mechanism being adjustable between an inoperative position wherein the driving element and cam are disconnected and an operative position wherein a driving connection results but only upon said element reaching a predetermined position relative to said cam, sensing means constructed to sense a backlog of lumber pieces on said holding conveyer behind said stop means, and means operatively connecting the sensing means and power-transmitting mechanism whereby the latter is adjusted between operative and inoperative positions as regulated by the sensing means.

4. Feeder mechanism for feeding lumber onto an off-bearing conveyor comprising a constantly driven holding conveyor mounted with its discharge end adjacent the feed end of the off-bearing conveyer, shiftable stop means adjacent said discharge end and adjustable between hold and release positions and operable in a hold position to inhibit forward travel of lumber pieces beyond the stop means and in a release position to release such pieces for forward travel, and mechanism for operating said shiftable stop means, the latter mechanism comprising a driving element movable in timed relation with the off-bearing conveyer, actuating mechanism operable when actuated to shift said shiftable stop means to its release position, a movable part, ordinarily stationary, constructed intermittently to actuate said adjusting mechanism on movement of the part by shifting said shiftable stop means first momentarily to its release position and then returning the stop means to its hold position, power-transmitting mechanism for connecting the driving element to said movable part, said power-transmitting mechanism being adjustable between an inoperative position wherein the driving element and movable part are disconnected and an operative position wherein a driving connection results between but only upon the driving element reaching a predetermined position relative to the movable part, sensing means constructed to sense a backlog of lumber pieces on said holding conveyer behind said stop means, and means operatively connecting the sensing means and said power-transmitting mechanism whereby the latter is adjusted between operative and inoperative positions as regulated by the sensing means.

5. In feeder mechanism having an off-bearing conveyer and a feed conveyer for delivering pieces to the off-bearing conveyer; shiftable stop means adjacent the discharge end of the feed conveyor adjustable between hold and release positions and operable in a hold position to inhibit the forward travel of pieces and in a release position to release such pieces for forward travel; and mechanism for operating said shiftable stop means; the latter mechanism comprising an intermittently operated clutch having rotatable driving and driven parts, and means for drivingly connecting said driving and driven parts constructed to produce the connection only when the two are in a predetermined relative position; said driving part being connected to the off-bearing conveyor to be rotated therewith; actuating mechanism actuated by said driven part on rotation of the part for actuating the shiftable stop means; mechanism for actuating the means for operatively connecting the driving and driven clutch parts; and sensing means constructed to sense a backlog of pieces on the holding conveyor for regulating the actuation of said last-mentioned mechanism.

6. In feeder mechanism for lumber, an off-bearing conveyer, a holding conveyer mounted with its discharge end adjacent the feed end of the off-bearing conveyer, fixed abutment means adjacent the discharge end of the holding conveyer for stopping the forward travel of boards beyond the holding conveyer, rotatable transfer roller means mounted adjacent said abutment means for transporting lumber from the holding conveyer to the off-bearing conveyer, the rotation axis of said transfer roller means extending transversely of the holding conveyer and being spaced below the support level of the holding conveyer and forwardly of said abutment means, said transfer roller means having upper circumferential surface portions disposed forwardly of and at least approximately at the height of the top of said abutment means, and kicker mechanism mounted adjacent said abutment means and located to the rear of said abutment means and below the support level of said holding conveyer, said kicker mechanism being operable when actuated to lift the leading edge of a piece adjacent said abutment means over the top of said abutment means.

7. In feeder mechanism for lumber, an off-bearing conveyer, a holding conveyer mounted with its discharge end adjacent the feed end of the off-bearing conveyer, abutment means adjacent the discharge end of the holding conveyer for stopping the forward travel of boards beyond the holding conveyer, rotatable transfer roller means mounted adjacent said abutment means for transporting lumber from the holding to the off-bearing conveyer, the rotation axis of said transfer roller means extending transversely of the holding conveyer and being spaced below the support level of the holding conveyer and forwardly of said abutment means, said transfer roller means having upper circumferential surface portions disposed forwardly of and at least approximately at the height of the top of said abutment means, kicker mechanism mounted adjacent said abutment means and located to the rear of said abutment means and below the support level of said holding conveyor, said kicker mechanism being operable when actuated to lift the leading edge of a lumber piece over the top of said abutment means, and control means for the kicker mechanism for regulating actuation of the kicker mechanism and including means responsive to the accumulation of lumber on said holding conveyor.

8. In feeder mechanism for lumber, an off-bearing conveyer; a feed conveyer substantially aligned with the off-bearing conveyer and mounted with its discharge end adjacent the feed end of the off-bearing conveyor; rotatable transfer roller means rotatable about a rotation axis disposed below the level of the discharge end and the feed end of the feed and off-bearing conveyers, respectively, and having upper circumferential surface portions subtended by the said ends of the conveyors; abutment means spaced rearwardly of said rotation axis projecting above the level of said discharge end and having a top not substantially higher than the level of said upper circumferential portions of said transfer roller means; and kicker mechanism supported adjacent and rearwardly of said abutment means and below the support level of the feed conveyer operable when actuated to lift the leading edge of a lumber piece over the top of said abutment means.

9. The device of claim 8 which further comprises control means for the kicker mechanism regulating actuation of the kicker mechanism and including means sensitive to the accumulation of lumber pieces on the feed conveyer.

10. In feeder mechanism for lumber, an off-bearing conveyer, a holding conveyer mounted with its discharge end adjacent the feed end of the off-bearing conveyer, abutment means adjacent the discharge end of the holding conveyer for stopping the forward travel of boards beyond the holding conveyer, rotatable transfer roller means mounted adjacent said abutment means for transporting lumber from the holding to the off-bearing conveyer, the rotation axis of said transfer roller means extending transversely of the holding conveyer and being spaced below the support level of the holding conveyer and forwardly of said abutment means, said transfer roller means having upper circumferential surface portions disposed forwardly of and at least approximately at the height of the top of said abutment means, kicker mechanism mounted adjacent said abutment means and located to the rear of said abutment means and below the support level of said holding conveyer, said kicker mechanism being operable when actuated to lift the leading edge of a lumber piece adjacent said abutment means over the top of said abutment means, and control means for the kicker mechanism regulating its actuation, said control means comprising an element movable in timed relation with movement of the off-bearing conveyer, sensing means operable to sense the backlog of lumber on the holding conveyer behind said abutment means, actuating mechanism for actuating said kicker mechanism, and regulator mechanism operatively interconnecting said element, sensing means and actuating mechanism whereby said actuating mechanism is actuated at intervals regulated by both said sensing means and the position of said element.

11. In feeder mechanism for lumber, an off-bearing conveyer, a holding conveyer mounted with its discharge end adjacent to the feed end of the off-bearing conveyer, abutment means adjacent the discharge end of the holding conveyer for stopping the forward travel of boards beyond the holding conveyer, rotatable transfer roller means mounted adjacent said abutment means for transporting lumber from the holding to the off-bearing conveyer, the rotation axis of said transfer roller means extending transversely of the holding conveyer and being spaced below the support level of the holding conveyer and forwardly of said abutment means, said transfer roller means having upper circumferential surface portions disposed forwardly of and at least approximately at the height of the top of said abutment means, kicker mechanism mounted adjacent said abutment means and located to the rear of said abutment means and below the support level of said holding conveyer, said kicker mechanism being operable when actuated to lift the leading edge of a lumber piece adjacent said abutment means over the top of said abutment means, and control means for the kicker mechanism regulating its actuation, said control means comprising a driving part movable in timed relation with the off-bearing conveyer, actuating mechanism for actuating said kicker mechanism, a driven part for actuating said actuating mechanism, sensing means operable to sense a backlog of lumber on the holding conveyer behind said abutment means, and mechanism for drivingly connecting the driving and driven parts operatively connected to said sensing means to be regulated thereby, said mechanism being constructed to produce such a connection only when the driving and driven parts occupy a predetermined relative position.

References Cited in the file of this patent
UNITED STATES PATENTS
2,743,000     Hedlund _____ Apr. 24, 1956